United States Patent [19]
Shin

[11] Patent Number: 5,764,296
[45] Date of Patent: Jun. 9, 1998

[54] RESOLUTION-VARIABLE ADAPTIVE PICTURE COMPRESSION

[75] Inventor: Jae-seob Shin, Seoul, Rep. of Korea

[73] Assignee: Samsung Electronics Co., Ltd., Suwon, Rep. of Korea

[21] Appl. No.: 791,409

[22] Filed: Jan. 30, 1997

Related U.S. Application Data

[63] Continuation of Ser. No. 172,266, Dec. 23, 1993, abandoned.

[30] Foreign Application Priority Data

May 31, 1993 [KR] Rep. of Korea .................. 1993 9735

[51] Int. Cl.[6] ........................................................ H04N 7/30
[52] U.S. Cl. ............................................. 348/405; 348/419
[58] Field of Search .................................. 348/384, 390, 348/396, 400–405, 409–413, 415, 416, 420, 429, 699, 419; 382/232, 236, 238, 248, 250, 251; H04N 7/137

[56] References Cited

U.S. PATENT DOCUMENTS

| 4,858,026 | 8/1989 | Richards | 348/409 |
|---|---|---|---|
| 4,947,249 | 8/1990 | Kondo | 348/409 |
| 4,972,260 | 11/1990 | Fujikawa et al. | 348/405 |
| 5,105,271 | 4/1992 | Niihara | 348/699 |
| 5,113,255 | 5/1992 | Nagata et al. | 348/699 |
| 5,144,426 | 9/1992 | Tanaka et al. | 348/409 |
| 5,173,773 | 12/1992 | Ueda et al. | 348/412 |
| 5,193,003 | 3/1993 | Kondo | 348/409 |
| 5,274,443 | 12/1993 | Dachiku et al. | 348/390 |
| 5,299,019 | 3/1994 | Pack et al. | 348/405 |
| 5,363,146 | 11/1994 | Saunders et al. | 348/699 |
| 5,387,938 | 2/1995 | Fukuda et al. | 348/420 |
| 5,398,078 | 3/1995 | Masuda et al. | 348/699 |
| 5,410,307 | 4/1995 | Hekstra et al. | 348/412 |
| 5,412,428 | 5/1995 | Tahara | 348/396 |
| 5,418,569 | 5/1995 | Ando | 348/405 |
| 5,418,570 | 5/1995 | Ueno et al. | 348/413 |
| 5,534,929 | 7/1996 | Tanaka | 348/405 |

Primary Examiner—Richard Lee
Attorney, Agent, or Firm—Foley & Lardner

[57] ABSTRACT

A resolution-variable adaptive picture compression method and the apparatus therefor varies the resolution of the currently compressed picture while adjusting its frame structure which is compressed according to the picture's condition, to thereby enhance picture quality with respect to the compression ratio.

22 Claims, 4 Drawing Sheets

RESOLUTION-VARIABLE ADAPTIVE PICTURE COMPRESSION

This application is a continuation of application Ser. No. 08/172,266, filed Dec. 23, 1993 now abandoned.

BACKGROUND OF THE INVENTION

The present invention relates to a resolution-variable adaptive picture compression method and the apparatus therefor, and more particularly, to a resolution-variable adaptive picture compression method in which not only the resolution of the picture being compressed is varied, but also the frame structure in compression can be controlled according to the picture element's condition, so as to enhance the picture quality for a given compression ratio.

In general, in the compression of a digitized motion picture, it is determined whether the subsequent frame in a succession of frames should be coded by an intra-mode or by an inter-mode, so that even if a complex frame is being input, the bit amount is fixed according to buffer capacity. Therefore, picture quality is degraded.

Also, since it is assumed that the picture being input in a succession is always moving continuously, even a frame sequence showing a small amount of motion change or a simple construction should be furnished with a fixed amount of bits, which is often considered unnecessary.

Moreover, since a method for compressing or enlarging the picture is not used, the picture quality may be degraded for the given bit ratio.

SUMMARY OF THE INVENTION

Accordingly, it is an object of the present invention to provide a resolution-variable adaptive picture compression method for varying the resolution of the picture being compressed and controlling the frame layout according to the picture condition, so as to enhance picture quality for a given compression ratio.

It is another object of the present invention to provide an apparatus most suitable to the resolution-variable adaptive picture compression method.

To accomplish the above object, the present invention provides a resolution-variable adaptive picture compression method comprising the steps of:

(a) changing the resolution of a motion picture, determining the difference picture between the current frame and preceding frame, and varying the frame structure according to the degree of motion in the motion picture;

(b) controlling the quantization step value when quantizing with respect to the varied structure frame, using the gradient operation result by which picture complexity can be determined; and (c) transmitting an error compensating signal to a transmitting channel along with the difference picture quantized by the quantization step in order to compensate for the error generated while converting the difference picture signal which is quantized according to the quantization step value into the original signal and while enlarging the original signal by a predetermined ratio, to thereby perform error compensation during picture enlargement.

To accomplish another object, the present invention provides a resolution-variable adaptive picture compression apparatus comprising an encoder including a frame memory for sequentially storing the picture sequence of the applied motion pictures, a variable-length coder for compressing the picture signal read out from the frame memory and converting the same into a bit stream, and a transmission buffer for buffering the output signal of the variable-length coder, the apparatus further comprising:

difference picture operation means for scaling down the motion picture stored in the frame memory by frame at a predetermined ratio to thereby obtain the difference picture between the previously transferred picture and the scaled down picture;

mode selection means for selecting whether the current frame is compressed according to an intra-mode or inter-mode, from the difference picture;

compressing means for compressing the motion picture or the difference picture which is compressed in the mode selected by the mode selection means; and error picture transferring means for enlarging the compressed motion picture to the original picture and obtaining and transferring the error between the compressed motion picture and the enlarged picture.

To accomplish still another object, the present invention provides a resolution-variable adaptive picture compression apparatus having a decoder including a data buffer for buffering the signal which is compressed and transferred via transfer channel and a variable-length decoder for variable-length-decoding the output signal of the data buffer, the apparatus comprising:

expansion means for expanding the output signal of the variable-length decoder according to the compression mode in the signal applied at the data buffer;

enlarging means for enlarging the output signal of the expansion means in a predetermined ratio; and error compensation means for compensating for the error of the enlarged picture of the enlarging means.

BRIEF DESCRIPTION OF THE DRAWINGS

The above object and other advantages of the present invention will become more apparent by describing in detail a preferred embodiment of the present invention with reference to the attached drawings in which:

FIG. 5 illustrates pixel positions on the complexity of an 8×8 block for performing the gradient operation in order to determine the quantization step value in an intra-mode coding; and FIG. 6 is a diagram showing the relationship of the active picture elements used for picture expansion.

DETAILED DESCRIPTION OF THE INVENTION

Figure 1:
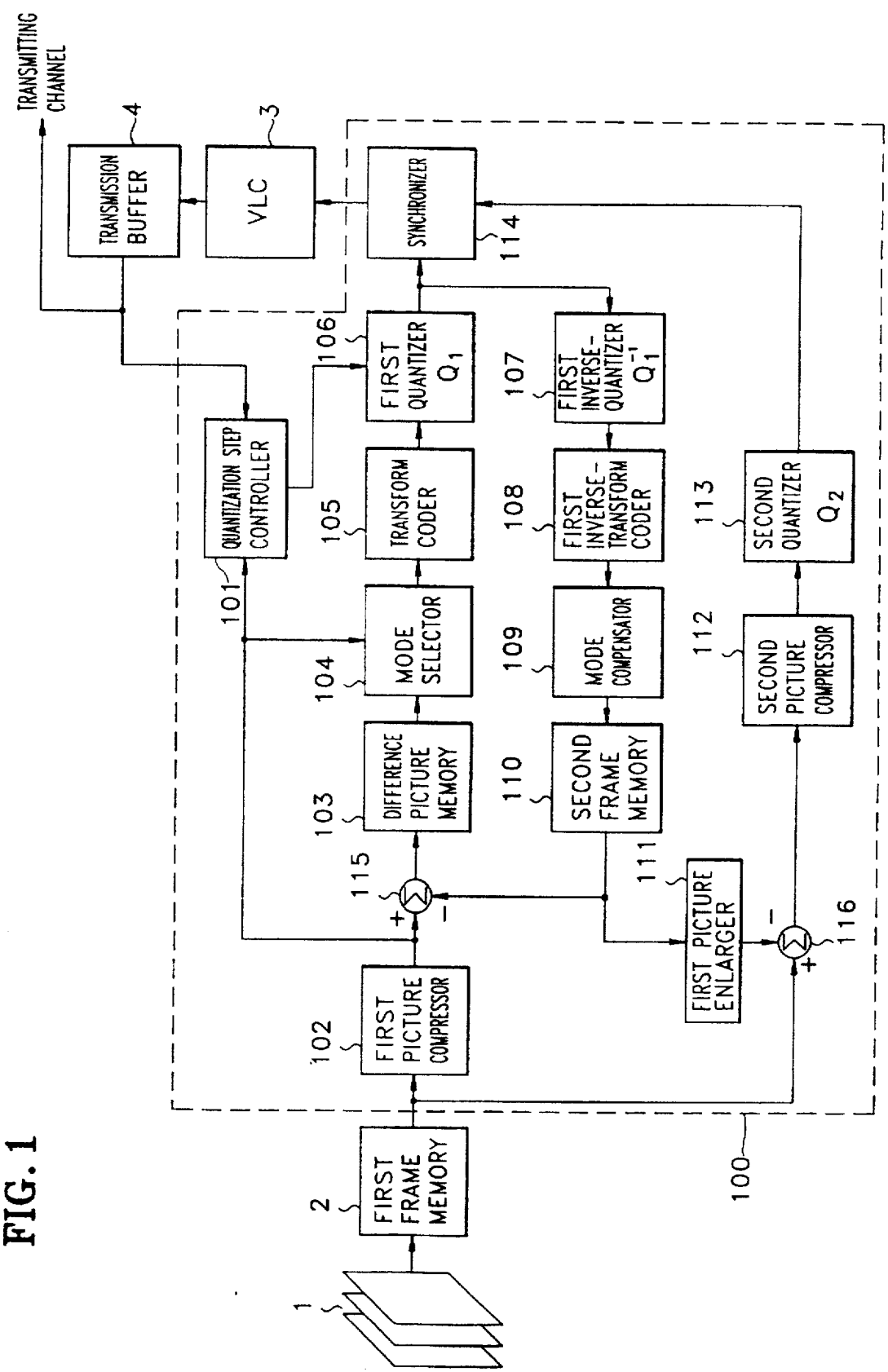
FIG. 1 is a block diagram of an encoder for use in a resolution-variable adaptive picture compression apparatus according to the present invention.

FIG. 1 is a block diagram showing an encoder for use in a resolution-variable adaptive picture compression apparatus.

Referring to FIG. 1, the encoder includes a first frame memory 2 for storing an applied picture sequence 1; a first picture compressor 102 for compressing the output signal of first frame memory 2 into one half its original size; a first subtracter 115 for subtracting the output signal of a second frame memory 110 (to be described later) from the output signal of first picture compressor 102; a difference picture memory 103 for storing the output signal of first subtracter 115; a mode selector 104 for selecting a mode according to the complexity of the picture output signal from difference picture memory 103 and the degree of motion between frames to thereby selectively output the output signal of first picture compressor 102 or that of difference picture memory 103; a transform coder 105 for transforming the output signal of mode selector 104 into a frequency component; a first quantizer 106 for quantizing the output signal of transform coder 105; a quantization step controller 101 for controlling the quantization step in first quantizer 106 according to the output signals of first picture compressor 102 and a transmission buffer 4 (described below); a first inverse-quantizer 107 for inversely quantizing the output signal of first quantizer 106; a first inverse-transform coder 108 for restoring the output signal of first inverse-quantizer 107 to the original signal; a mode compensator 109 for compensating the output signal of first inverse-transform coder 108; a second frame memory 110 for storing the output signal of mode compensator 109; a first picture enlarger 111 for doubling the output signal of second frame memory 110; a second subtracter 116 for subtracting the output signal of first picture enlarger 111 from the output signal of first frame memory 2; second picture compressor 112 for compressing the output signal of second subtracter 116 to one half its original size in both horizontal and vertical directions; a second quantizer 113 for quantizing the output signal of second picture compressor 112; a synchronizer 114 for synchronizing the output signal of first quantizer 106 to the output signal of second quantizer 113; a variable-length coder (VLC) 3 for variable-length-coding the output signal of synchronizer 114; and a transmission buffer 4 for buffering the output signal of VLC 3 to be output to the transmitting channel and simultaneously feeding back the same to quantization step controller 101.

Figure 2:
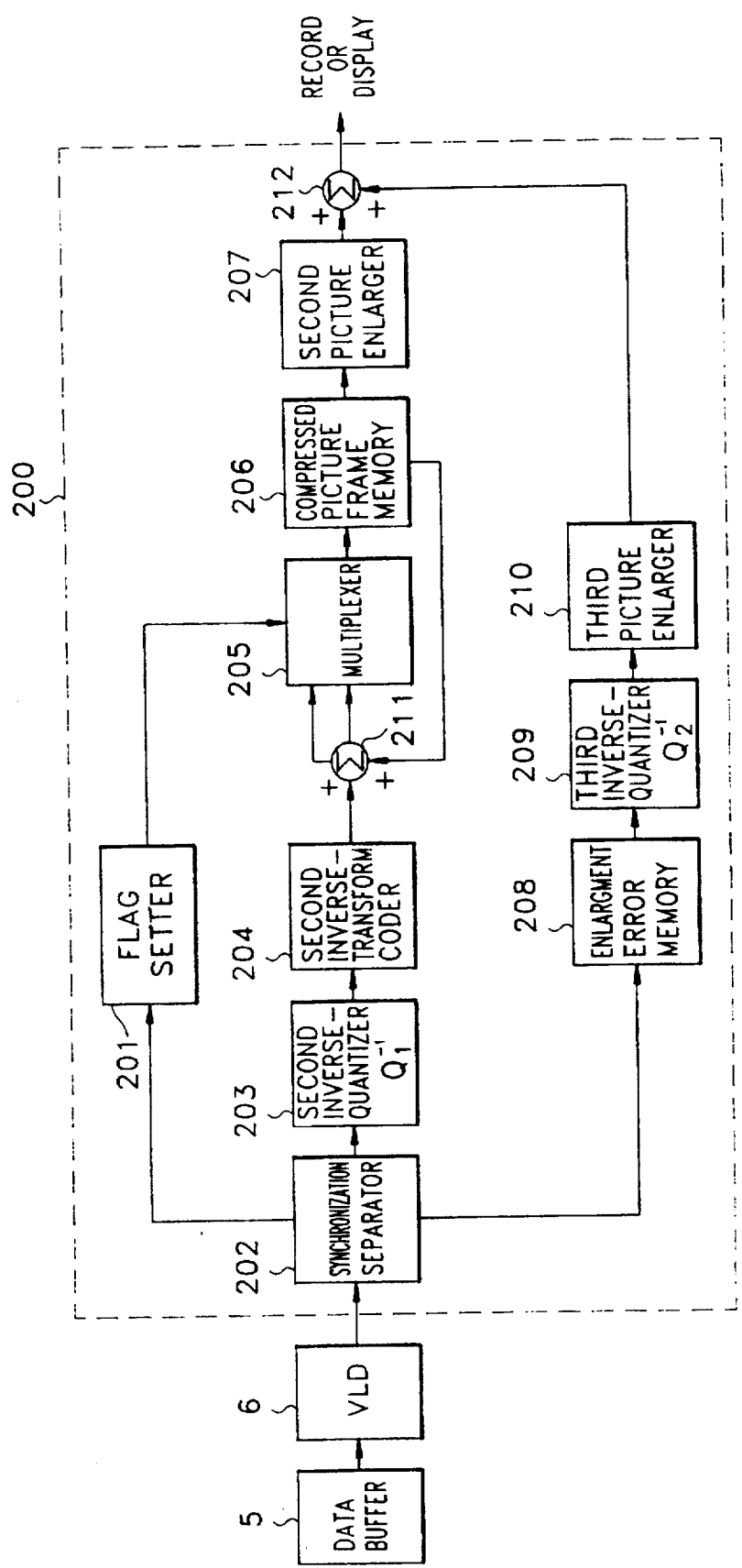
FIG. 2 is a block diagram of a decoder for use in the resolution-variable adaptive picture compression apparatus according to the present invention.

FIG. 2 is a block diagram showing a decoder for use in the resolution-variable adaptive picture compression apparatus according to the present invention.

Referring to FIG. 2, the decoder includes a variable-length decoder (VLD) 6 for variable-length-decoding the output signal of a data buffer 5; a synchronization separator 202 for separating the synchronization signal from the output signal of VLD 6; a second inverse quantizer 203 for inversely quantizing the output signal of synchronization separator 202; a second inverse-transform coder 204 for restoring the output signal of second inverse quantizer 203 back to the original signal; a first adder 211 for adding the output signal of second inverse-transform coder 204 to that of a compression picture frame memory 206 (described below); a flag setter 201 for setting a flag in the output signal of synchronization separator 202; a multiplexer 205 for selectively outputting the output signal of second inverse-transform coder 204 or the output of first adder 211 according to the output signal of flag setter 201; a compression picture frame memory 206 for storing the output signal of multiplexer 205; a second picture enlarger 207 for doubling the output signal of compression picture frame 206; an enlargement error memory 208 for storing the output signal of synchronization separator 202; a third inverse-quantizer 209 for inversely quantizing the output signal of enlargement error memory 208; a third picture enlarger 210 for doubling the output signal of third inverse-quantizer 209; and a second adder 212 for adding the output signal of second picture enlarger 207 to the output signal of third picture enlarger 210 and then storing or displaying the summed result.

Figure 3:
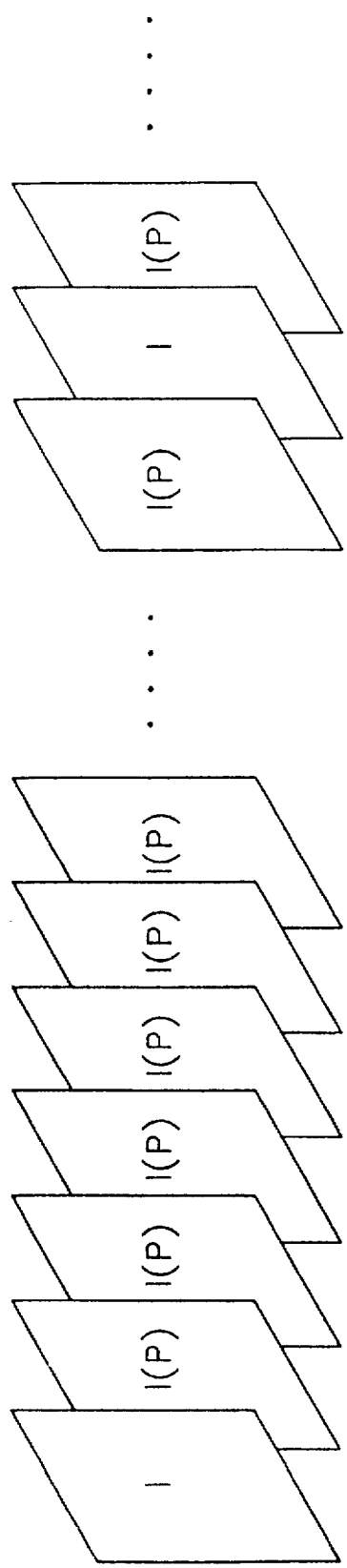
FIG. 3 shows the variable frame structure.

FIG. 3 shows the variable-frame structure. Here, reference symbol I represents an intra frame of the intra-mode, and P is a predictive frame of the inter-mode.

Figure 4A:
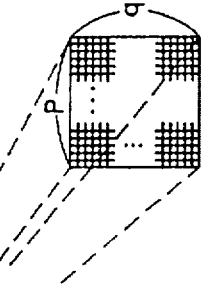
FIG. 4 shows the form of subblock division for use in the operation for intra-mode or inter-mode selection.
Figure 4B:
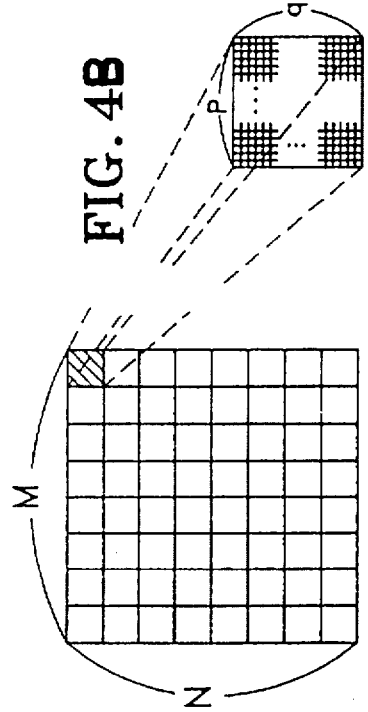

FIG. 4 shows how the picture block is divided into the subblocks for use in the operation for intra-mode or inter-mode selection. Here, reference symbols M and N represent the horizontal and vertical resolutions of a frame, respectively. Also, reference numerals p and q are the horizontal and vertical resolutions of each subblock, respectively.

Figures 5, 6:
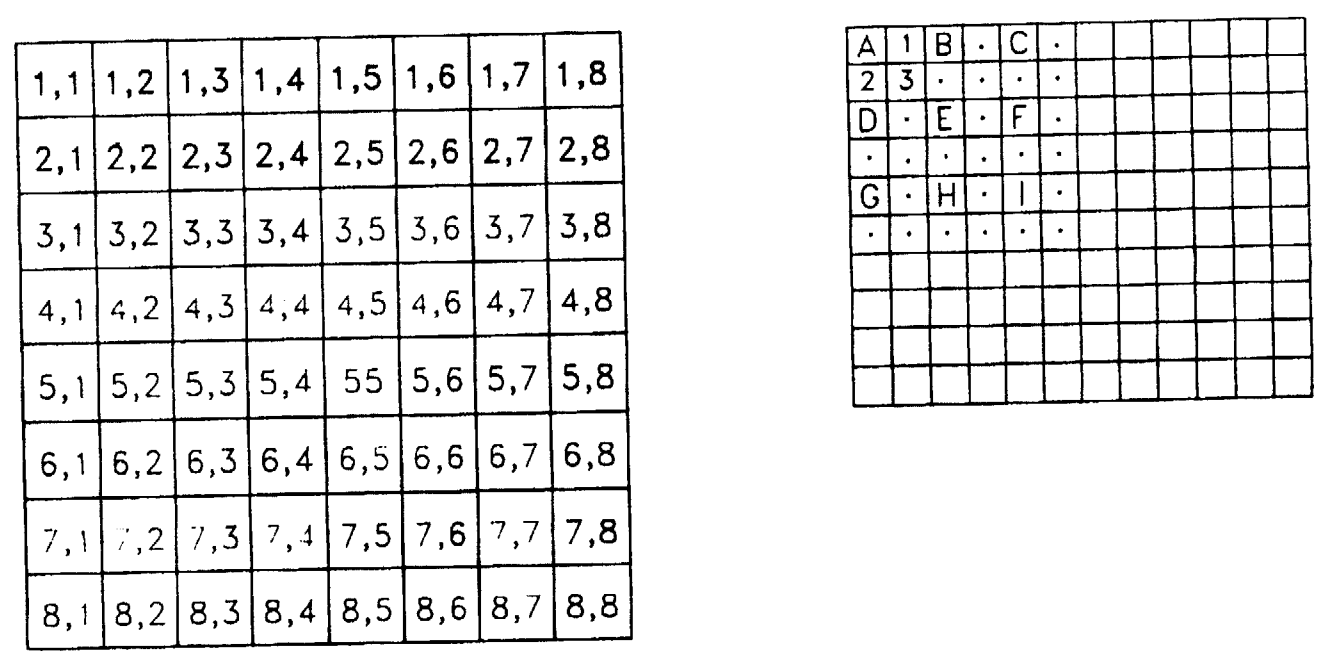

FIG. 5 illustrates pixel positions on the complexity of an 8×8 block for performing the gradient operation in order to determine the quantization step value in an intra-mode coding.

FIG. 6 illustrates the relationship for each pixel that is active during picture enlargement by using the weight value thereof.

The operation of the resolution-variable adaptive picture compression apparatus will be described with reference to FIGS. 1–6.

Two basic concepts supporting the present invention are as follows:

Firstly, among the successive frames of a motion picture, those frames showing little motion should use the previously coded frame to thereby reduce the required amount of bits. Here, since it is unnecessary to obtain picture motion vectors, the apparatus can be more simplified while varying the frame structure.

Secondly, the picture size is reduced to one half its original length and width. Here, only the error component for enlargement is additionally coded and transferred for a decrease of the data amount (i.e., the total number of bits is decreased), so that the picture quality can be improved.

The resolution-variable adaptive picture compression apparatus according to the present invention comprises generally a picture compressing portion (i.e., an encoder) and a picture restoring portion (i.e., a decoder).

The operation of the encoder and decoder will now be described. Referring the encoder shown in FIG. 1, picture sequence 1 of a motion picture is stored in first frame memory 2 by frames. First picture compressor 102 compresses each frame to thereby scale down the length and width to one half the original size. At this point, to remove the interference between pictures (frames), low-pass-filtering is performed before the subsampling is performed.

First subtracter 115 obtains the difference between the output signal of first picture compressor 102 and the previously coded frame supplied by second frame memory 110, and stores the difference in difference picture memory 103.

Mode selector 104 selects which mode (among the intra-mode and inter-mode) will be used for coding the difference picture sequentially read out from difference picture memory 103, depending upon the picture complexity and the degree of motion between frames.

At this time, as for the successive intra-modes shown in FIG. 3, the minimum repetition period of the intra-mode frame is two frames, and its maximum repetition period is preferably restricted to less than 30 frames, to prevent picture quality degradation. (This period can be set arbitrarily by the system designer.) Mode selector 104 receives the output signal of first picture compressor 102 (i.e., the original picture) and the output signal of difference picture memory 103, that is, the difference picture. Here, as shown in FIG. 4, an M×N frame is partitioned into 64 p×q subblocks, and the variance of each block is obtained as follows:

$$\sigma_{Di}^2 = \frac{\sum_{m=1}^{p} \sum_{n=1}^{q} (X(m,n) - X)^2}{p \times q} \quad (1)$$

where X(m,n) is a pixel value in a subblock, X is an average value of the subblock, and i is an integer from 1 to 64.

Mode selector 104 determines the frame to be one having little motion if the number of blocks, among the 64 blocks, having a variance obtained by Equation (1) exceeding a given threshold value is less than five. Accordingly, as to such a frame, mode selector 104 encodes the output signal of difference picture memory 103, i.e., a difference picture, in an inter-mode, and otherwise encodes the output signal of first picture compressor 102, i.e., the original picture, in an intra-mode.

Transform coder 105 is for transforming the space picture value into frequency component, generally, by a discrete cosine transform (DCT) operation.

First quantizer 106 quantizes the frequency component output from transform coder 105, wherein the quantization step size is controlled by quantization step controller 101. In the case of inter-mode coding the difference picture, the quantization step value does not change. However, in the case of intra-mode coding the original picture, the gradient operation result for the original 8×8 block frame is utilized for coding the original picture, as shown in FIG. 5. As for the 8×8 block coordinates, the gradient operation is expressed as follows:

$$g_1 = p(m,n) - p(m+1,n+1) \quad (2)$$

$$g_2 = p(m,n+1) - p(m+1,n) \quad (3)$$

$$G_H = |g_1 + g_2| \quad (4)$$

$$G_V = |g_1 - g_2| \quad (5)$$

$$G_C = |g_1| \quad (6)$$

$$G_D = |g_2| \quad (7)$$

$$G = \frac{1}{64} \left( \sum_{i=1}^{8} \sum_{j=1}^{8} G_{H(i,j)} + \sum_{i=1}^{8} \sum_{j=1}^{8} G_{V(i,j)} + \sum_{i=1}^{8} \sum_{j=1}^{8} G_{C(i,j)} + \sum_{i=1}^{8} \sum_{j=1}^{8} G_{D(i,j)} \right) \quad (8)$$

For an 8×8 block, $g_1$ and $g_2$ are calculated by Equations (2) and (3) based on a 2×2 subblock. Next, horizontal and vertical gradients $G_H$ and $G_V$, and diagonal gradients $G_C$ and $G_D$ are obtained using this result. All gradients are summed so that total gradient G is obtained for an 8×8 block. The G value, generally of a fixed ratio (e.g., 0.5 to 3), is multiplied by the quantization step value which is fed back to transmission buffer 4 so that human visual perception can be best complimented. The quantized signal of first quantizer 106 is supplied to synchronizer 114 for producing a bit-stream and is sent to first inverse-quantizer 107 for producing a reference signal for the next frame calculation. The output of first inverse quantizer 107 is next sent to first inverse-transform coder 108, and further to mode compensator 109, so that it is finally recorded in second frame memory 110 as a restored preceding frame signal. The preceding frame signal may be used for producing an error signal for use in compensating for the error in the picture enlargement.

The preceding frame signal is applied at first adder 115 to be used for the calculation of the succeeding frame in the manner described above. The preceding frame signal is also provided to first picture enlarger 111 to aid in the doubling of the width and length of the picture. Next, second subtracter 116 subtracts the output signal of first picture enlarger ill from the original picture signal used in encoding. The difference value from subtracter 116 is sent to second picture compressor 112 which compresses the picture into one half its original size. Next, the output signal of second picture compressor 112 is sent to and quantized by second quantizer 113. The output signal of second quantizer 113 is sent to synchronizer 114, together with the quantized signal of first quantizer 106. In synchronizer 114, the output signals of first quantizer 106 and second quantizer 113 are sequentially arranged and sent to variable-length coder 3.

Variable-length coder 3 converts the output signal of synchronizer 114 to a certain bit stream by using the Huffman coding method, so that the converted signal is output to transmission buffer 4.

Transmission buffer 4 calculates the amount of bit stream which is sent from variable-length coder 3, and determines the proper quantization step for subsequently coding the next frame, which is then, on the one hand, fed back to quantization step controller 101 and, on the other hand, sent to the transfer channel and recording medium at a fixed bit rate. Therefore, a series of encoding operations is completed.

The decoding of the encoded and transferred signal is performed as shown in FIG. 2, wherein the job sequence is opposite to the encoding.

Firstly, the bit stream coming into data buffer 5 is sent to variable-length decoder 6 which converts the bit stream into picture data that is subsequently applied at synchronization separator 202.

Synchronization separator 202 separates the picture data into the control and picture signals. The separated original picture signal comes through second inverse-quantizer 203 and second inverse-transform coder 204 and is converted into a space pixel value, which is, on the one hand, applied directly at multiplexer 205 and, on the other hand, applied at first adder 211 so as to be added to the previously decoded frame. The summed result is then sent to multiplexer 205.

Multiplexer 205 selects the output signal of second inverse-transform coder 204 or the output signal of first adder 211 according to the control signal generated by flag setter 201, so as to record the selected signal in compression picture frame memory 206.

Second picture enlarger 207 doubles the data read out from compression picture frame memory 206, with respect to picture width and length. Then, second adder 212 adds the doubled data to error data enlarged by synchronization separator 202, enlarging error memory 208, third inverse-quantizer 209 and third picture enlarger 210. Therefore, the summed result is recorded or displayed for the desired purpose, thus completing the entire decoding process.

The picture enlarging operation method just used in the present invention will be described, hereinafter, in more detail. Referring to FIG. 6, the pixel positions in the compressed picture are denoted by the letters A, B, C, D, E, F, G, H and I. Here, the pixel positions where interpolation should be performed by enlargement are denoted by reference numbers. In FIG. 6, "1", "2" and "3" pixels values are determined as follows:

$$'1' = \frac{10A + 10B + 3C + 3D + 3E + 2F + G + H + I}{34} \quad (9)$$

$$'2' = \frac{10A + 3B + 2C + 10D + 3E + F + 3G + H + I}{34} \quad (10)$$

$$3' = \frac{10A + 10B + 5C + 10D + 10E + 5F + 5G + H + I}{57} \quad (11)$$

Once the "1," "2" and "3" values are determined, interpolation is performed repetitively while moving to the right and downward. To calculate the values of pixels "1", "2" and "3", the values of nine pixels in the compressed picture are averaged with their own weights as expressed in Equations (9) through (11) so that the nearest pixels are heavily weighted. That is, such operation is repetitively performed throughout the entire frame until the picture enlarging operation is completed.

In the resolution-variable adaptive picture compression method and apparatus as described above, it is unnecessary to calculate the motion vectors, so that the operation can be simplified, thereby attaining cost savings. Also, since the bit rate is increased with the varying of resolution, the picture quality is enhanced. Accordingly, this apparatus and method can be utilized in low-resolution application systems.

Also, the apparatus and method use a variable frame structure so as to improve picture quality in regard to a variety of pictures. Human visual perception is considered in the gradient calculation and the error signal is utilized for compensating for the error in picture enlargement, which thereby improves picture quality.

What is claimed is:

1. A resolution-variable adaptive picture compression method comprising the steps of:

(a) changing a picture resolution of a current frame of an original signal of a motion picture made up of successive frames;

(b) determining a difference picture between said current frame and a preceding frame;

(c) varying a frame structure into a varied frame structure according to a pixel variance of said difference picture, and, depending on said pixel variance, selecting as an output frame one of said varied frame structure and said current frame with a mode selector;

(d) determining a picture complexity using a gradient operation based on said current frame;

(e) transform coding said output frame;

(f) quantizing said output frame, with a quantization step value determined by a quantization step controller according to said picture complexity, to produce a quantized frame;

(g) generating an error compensating signal representing an error associated with converting said quantized frame back into a recreated approximation of said original signal;

(h) transmitting said error compensating signal to a transmitting channel along with said quantized frame; and wherein both the mode selector and the quantization step controller receive the current frame from the step of changing.

2. A resolution-variable adaptive picture compression method as recited in claim 1, wherein in said step (a), said picture resolution of the current frame is reduced by one-half.

3. A resolution-variable adaptive picture compression method as recited in claim 1, wherein said pixel variance of said difference picture is compared with a predetermined threshold value to select said current frame or said difference picture for said varied frame structure.

4. A resolution-variable adaptive picture compression method as recited in claim 1, further comprising the step of dividing each frame into 64 subblocks and determining a degree of deviation for each block in order to select one of an intra-mode and an inter-mode for said varied frame structure.

5. A resolution-variable adaptive picture compression method as recited in claim 4, wherein, when determining said quantization step value, the gradient operation is used for determinity the picture complexity in said intra-mode.

6. A resolution-variable adaptive picture compression apparatus comprising an encoder including a frame memory for sequentially storing a picture sequence of an applied motion picture, a variable-length coder for compressing a picture signal read out from said frame memory and converting said picture signal into a bit stream, and a transmission buffer for buffering the output signal of said variable-length coder, said apparatus further comprising:

difference picture operation means for scaling down each current frame of said picture sequence stored in said frame memory at a predetermined ratio, and for obtaining a difference picture representing a difference between a previously transferred frame and a current scaled down frame;

mode selection means for selecting one of said difference picture and said current scaled down frame according to a pixel variance of said difference picture;

compressing means for compressing said one of said current scaled down frame and said difference picture selected by said mode selection means to provide a compressed frame; and error picture transferring means for enlarging said compressed frame back to an original sized frame, obtaining an error signal between an original frame of said picture sequence stored in said frame memory and said original sized frame and for transferring said error signal;

said compressing means having:

a transform coder configured to receive said one of said current scaled down frame and said difference picture selected by said mode selection means, said transform coder producing a frequency component output;

a quantizer configured to quantize said frequency component output in accordance with a quantization step size; and a quantization step size controller configured to provide said quantization step size to said quantizer based on a picture complexity of said current frame;

wherein both he mode selection means and the quantization step size controller receive the current scaled down frame.

7. A resolution-variable adaptive picture compression apparatus as recited in claim 6, wherein said predetermined ratio is substantially equal to ½.

8. The resolution-variable adaptive picture compression apparatus as recited in claim 6, wherein said difference picture is obtained by subtracting said previously transferred frame directly from said current scaled down frame.

9. The resolution-variable adaptive picture compression apparatus as recited in claim 6, wherein said transmission buffer determines a quantization step value for a subsequent frame and feeds back said quantization step value for said subsequent frame to said quantization step controller.

10. The resolution-variable adaptive picture compression apparatus as recited in claim 6, wherein said error picture transferring means comprises a synchronizer configured to sequentially arrange said compressed frame and said error signal to produce a synchronized signal, said error picture transferring means providing said synchronized signal to said variable-length coder.

11. The resolution-variable adaptive picture compression apparatus as recited in claim 6, wherein said error picture transferring means comprises:

error signal compressing means for compressing said error signal to produce a compressed error signal; and a synchronizer configured to sequentially arrange said compressed frame and said compressed error signal to produce a synchronized signal, said error picture transferring means providing said synchronized signal to said variable-length coder.

12. A resolution-variable adaptive picture compression apparatus as recited claim 6, wherein said pixel variance of said difference picture is compared with a predetermined threshold value to select said one of said current scaled down frame and said difference picture.

13. The resolution-variable adaptive picture compression apparatus as recited in claim 6, wherein said difference picture comprises a plurality of subblocks, said pixel variance is determined for each of the plurality of subblocks, and said mode selection means selects said one of said current scaled down frame and said difference picture in accordance with a pre-determined number of said plurality of subblocks having said determined pixel variance in excess of a pre-determined pixel variance threshold.

14. The resolution-variable adaptive picture compression apparatus as recited in claim 13, wherein each of said plurality of subblocks comprises a p×q subblock and wherein said pixel variance of said p×q subblock is calculated according to the equation:

$$\sigma_{Di}^2 = \frac{\sum_{m=1}^{p} \sum_{n=1}^{q} (X(m,n) - X)^2}{p \times q}$$

where X(m,n) is a pixel value in said p×q subblock, X is an average pixel value of said p×q subblock, and i, m, and n are integers.

15. An adaptive picture compression apparatus comprising:

a first frame memory for receiving and storing a current frame of a picture sequence; a picture resolution changer for changing a picture resolution of the current frame;

a second frame memory for storing a previous frame of the picture sequence;

a subtractor for producing a difference picture from the current frame stored in the first frame memory and the previous frame stored in the second frame memory;

a mode selector for receiving the current frame from the picture resolution changer and the difference picture from the subtractor, said mode selector providing an output frame corresponding to one of the current frame and the difference picture based on a degree of motion in the difference picture;

a transform coder for receiving the output frame of the mode selector and producing a transformed frame therefrom;

a quantizer for receiving the transformed frame and producing a quantized frame therefrom; and a quantization step controller for providing a quantization step value to said quantizer;

wherein both the mode selector and the quantization step controller receive the current frame from the picture resolution changer and the quantization step controller provides the quantization step value to said quantizer based on a picture complexity of the current frame.

16. The adaptive picture compression apparatus according to claim 15, wherein said mode selector provides the output frame in one of an intra-mode and an inter-mode without regard to when a previous intra-mode frame was provided.

17. The adaptive picture compression apparatus as recited in claim 15, wherein the difference picture comprises a plurality of subblocks, and wherein the degree of motion is determined in accordance with a pre-determined number of said plurality of subblocks having a pixel variance in excess of a pre-determined pixel variance threshold.

18. The adaptive picture compression apparatus according to claim 17, wherein each of said plurality of subblocks comprises a p×q subblock and wherein said pixel variance of said p×q subblock is calculated according to the equation:

$$\sigma_{Di}^2 = \frac{\sum_{m=1}^{p} \sum_{n=1}^{q} (X(m,n) - X)^2}{p \times q}$$

where X(m,n) is a pixel value in said p×q subblock, X is an average pixel value of said p×q subblock, and i, m, and n are integers.

19. A method for compressing a picture comprising the steps of:

receiving and storing a current frame of a picture sequence with a first frame memory changing a picture resolution of the current frame;

storing a previous frame of the picture sequence with a second frame memory;

subtracting the previous frame from the current frame to produce a difference picture from the current frame stored in the first frame memory and the previous frame stored in the second frame memory;

generating an output frame with a mode selector, the output frame corresponding to one of the current frame and the difference picture based on a degree of motion in the difference picture;

receiving the output frame with a transform coder and producing a transformed frame therefrom;

receiving the transformed frame with a quantizer and producing a quantized frame therefrom; and providing a quantization step value to said quantizer with a quantization step controller;

wherein both the mode selector and the quantization step controller receive the current frame from the step of changing and the quantization step controller provides the quantization step value to said quantizer based on a picture complexity of the current frame.

20. The method for compressing a picture as recited in claim 19, wherein the mode selector provides the output frame in one of an intra-mode and an inter-mode without regard to when a previous intra-mode frame was provided.

21. The method for compressing a picture as recited in claim 19, wherein the difference picture comprises a plurality of subblocks, and wherein the degree of motion is determined in accordance with a pre-determined number of the plurality of subblocks having a pixel variance in excess of a pre-determined pixel variance threshold.

22. The method for compressing a picture as recited in claim 21, wherein each of the plurality of subblocks comprises a p×q subblock and wherein the pixel variance of said p×q subblock is calculated according to the equation:

$$\sigma_{Di}^2 = \frac{\sum_{m=1}^{p} \sum_{n=1}^{q} (X(m,n) - X)^2}{p \times q}$$

where X(m,n) is a pixel value in the p×q subblock, X in an average pixel value of the p×q subblock, and i, m, and n are integers.

* * * * *